UNITED STATES PATENT OFFICE.

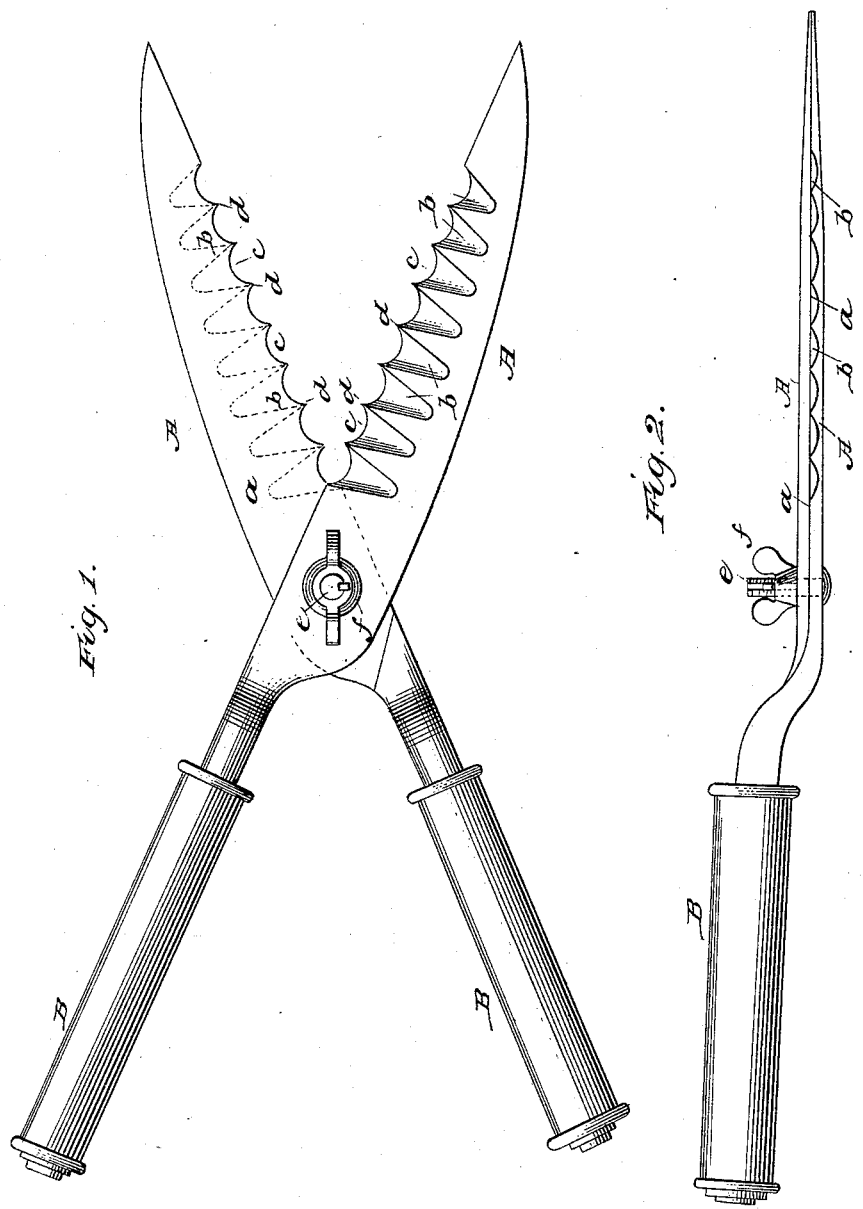

JAMES R. GASCOIGNE, OF DEVENPORT, NEW ZEALAND.

PRUNING-SHEARS.

SPECIFICATION forming part of Letters Patent No. 399,869, dated March 19, 1889.

Application filed October 12, 1888. Serial No. 287,886. (No model.)

*To all whom it may concern:*

Be it known that I, JAMES R. GASCOIGNE, of Devenport, Auckland, New Zealand, have invented a new and useful Improvement in Hedge Trimming and Pruning Shears, of which the following is a full, clear, and exact description.

This invention relates to shears for trimming hedges and for pruning purposes generally, in which the blades of the shears, instead of being made with straight cutting-edges, have cutting-edges of an irregular shape; and the invention comprises a novel, irregular, and scalloped construction of the blades of the shears, substantially as hereinafter described, and pointed out in the claim, and whereby not only are the twigs and branches under operation held from slipping, but increased or better work can be done with less labor, and the cutting-edges can be readily sharpened.

Reference is to be had to the accompanying drawings, forming a part of this specification, in which similar letters of reference indicate corresponding parts in both the figures.

Figure 1 represents a face or side view of a pair of hedge trimming or pruning shears embodying my invention, and Fig. 2 a longitudinal edge view of the same.

The shears may be made of any suitable size and of the ordinary materials; nor need they differ in their general configuration from that of other shears used for similar purposes; but their pivoted and crossing blades A A are of peculiar construction upon their cutting edges and surfaces. Thus the meeting faces $a\ a$ of the blades are flat and parallel, while their backs, which may be beveled and brought to a point at the outer extremity of each blade, are formed with a series of tapering flutes, $b$, of curvilinear form in transverse section and of increasing depth and width toward the cutting-edges of the blades, thereby terminating in a series of sharp cutting-edges, $c$, of concave outline, due to the scalloped configuration of the backs of the blades, said flutes leaving or forming pointed tapering teeth-like formations $d$ in between them. There may be any number of these scallops or flutes $b$ in each blade—that is, two or more—and they are so arranged on each blade that when the blades are closed the flutes and concave cutting-edges of the one blade lie opposite or in line with the flutes and concave cutting-edges of the other blade. Not only will the blades when thus constructed hold the twigs or branches being cut free from slip, but they will do the work more perfectly, and a larger amount of work may be done in a given time with less labor. The concave cutting-edges $c$, too, may be readily sharpened, when required, either by grinding the blades on their flat sides or by filing the flutes $b$ with a half-round or a rat-tail file. The shanks of the blades A A may be fitted with any suitable handles, B B. The pivot $e$, upon or with which the blades turn, may be a suitably-headed screw-threaded pin fitted with a thumb-nut, $f$, and be slotted to receive a key. This will prevent the thumb-nut from working loose when using the shears, yet admit of the blades being tightened up and of being detached from one another when it is necessary or desirable to take them apart to sharpen them. As such or like pivotal fastenings, however, are common to other articles, no claim will here be made to the same, and any other suitable pivotal fastening may be used, if desired.

Having thus described my invention, what I claim as new, and desire to secure by Letters Patent, is—

In hedge trimming or pruning shears, the combination of the pivoted blades A A, having flat meeting faces $a\ a$, and each constructed with a series of tapering flutes, $b$, in the back of the blade, of curvilinear form in transverse section and of increasing depth and width toward the cutting-edge of the blade, and leaving or forming sharp concave cutting-edges $c$, said flutes and concave cutting-edges of the two blades being arranged to lie opposite or in line with one another when the blades are closed, essentially as shown and described.

JAMES R. GASCOIGNE.

Witnesses:
 JAS. SLATOR,
 JNO. TYLER CAMPBELL.